United States Patent Office 3,318,673
Patented May 9, 1967

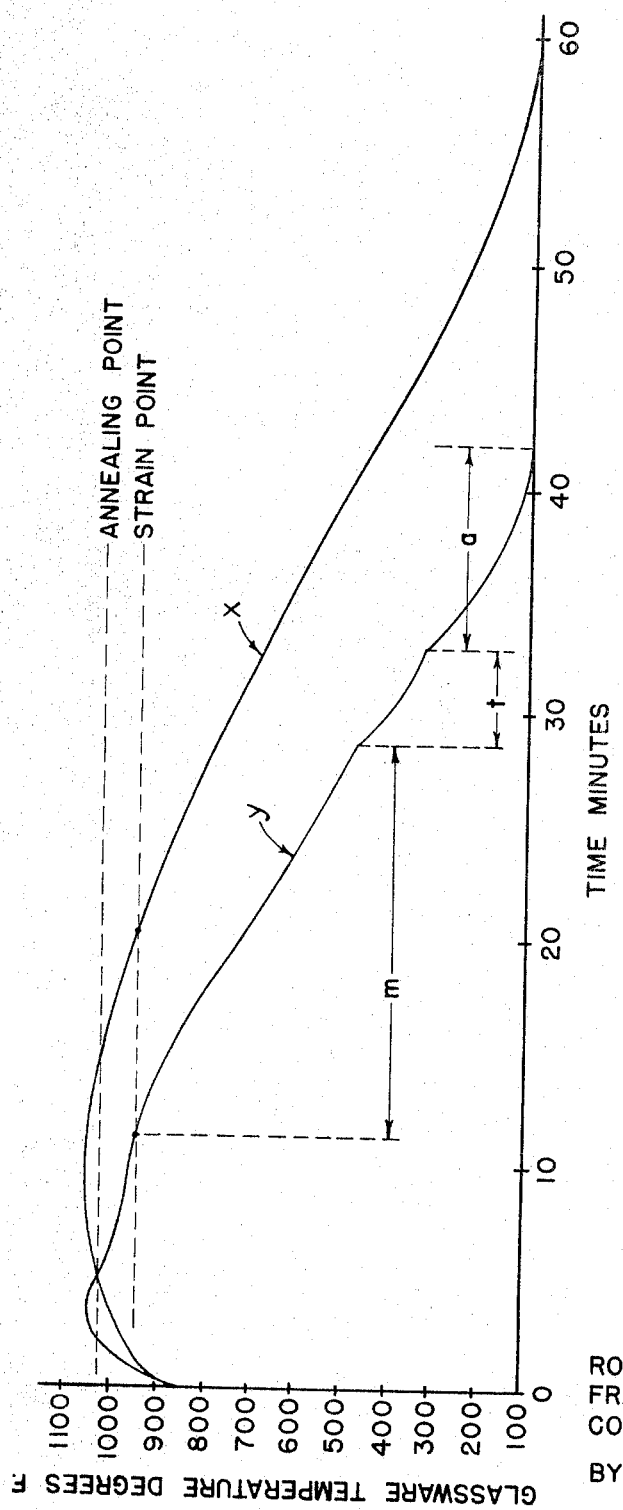
INVENTORS
ROBERT A. FULLER
FRANCIS E. DORSEY
CONSTANTINE W. KULIG

3,318,673
GLASSWARE ANNEALING METHOD
Robert A. Fuller, West Hartford, Conn., Francis E. Dorsey, Millville, N.J., and Constantine W. Kulig, Wethersfield, Conn., assignors to Emhart Corporation, Bloomfield, Conn., a corporation of Connecticut
Original application Feb. 28, 1963, Ser. No. 261,643, now Patent No. 3,259,481. Divided and this application Dec. 20, 1965, Ser. No. 514,978
5 Claims. (Cl. 65—118)

This invention relates to the annealing of glassware and this application is a division of United States application Serial No. 261,643 on "Glassware Annealing Method and Apparatus" filed Feb. 28, 1963 now patent Number 3,259,481.

Modern glass making machinery has become more productive and provides more glassware per unit of time than known lehrs using known method of glassware annealing can handle. One solution to this problem would be to provide longer or larger lehrs, but this is not the answer because space requirements are limited. Further, space that was once available is now taken by automatic inspection apparatus and the like in glassware producing lines so that the space for lehr use is limited.

The answer provided in accordance with the present invention is to decrease the annealing time in a new method of glassware annealing so that a lehr capable of performing the improved method can be used in the available space and fully anneal the glassware and cool it to room temperature while keeping up with the high production requirements of modern glassware making machinery.

In keeping with the present invention there is provided an improved glassware annealing process which decreases the annealing time while nonetheless providing for heating of the glassware as required to completely release strain; cooling of the glassware without introduction of objectionable permanent strain; and further cooling of the ware without introduction of temporary strain that might produce breakage. In developing the method of this invention, it has been borne in mind that the rate of release of strain in glass is proportional to the amount of strain and inversely proportional to the viscosity of the glass. Further, the method of this invention has been developed with the understanding that if the object of the annealing is not to obtain glass of a maximum refractive index or density, as in the production of optical glass, but it is the object to obtain glass substantially free of strain, as in the manufacture of glass containers, the glass may be cooled more rapidly at the higher temperature end of the process so that any strains introduced will be rapidly relieved, and the glass can be cooled more slowly at the lower temperature end of the process to avoid permanent strain. This understanding or development in connection with the invention is in sharp contrast to the annealing theory developed by Adams and Williamson many years ago for annealing optical glass, the theory that is applied generally to the manufacture of other glass today.

Therefore, it can be said that it is the general object of the invention to provide an improved method af annealing glassware exhibiting a substantially higher degree of efficiency than has heretofore been obtained.

It is a further feature of the invention to provide an annealing method that departs substantially from conventional practice in the reduction of glassware temperature from its annealing point to its strain point, and which thereby provides a substantial increase in the overall rate of ware temperature reduction in this range.

The drawing shows a preferred embodiment of the method of the invention and such embodiment will be described, but it will be understood that various changes may be made from the method disclosed and that the drawings and description are not to be construed as defining or limiting the scope of the invention, the claims forming a part of this specification being relied upon for that purpose.

The single figure of the drawing is a graphical illustration and includes curves reflecting the method of the present invention and a method of known type.

As mentioned, the method of the present invention contemplates improvement in the heating of glassware, heat being applied from above the ware by high intensity radiation with the ware transported in an upright attitude on the lehr conveyor.

Referring particularly to the drawing and comparing curves $x$ and $y$ where $x$ represents an annealing method of a conventional lehr and $y$ represents the annealing method of the present invention, a substantial time saving will be apparent. In practice of the method of the present invention in annealing a particular type of ware, the glassware reached a temperature of approximately 1050° F. in about three minutes elapsed time whereas the same type ware requires approximately seven minutes to reach the same temperature under the conventional method. Generally similar improvement is to be anticipated in handling other types of ware. Observing that the glassware under consideration has an annealing point of approximately 1020° F. (defined as that temperature corresponding generally to the upper end of the annealing range), it will be seen that the ware in each case is actually heated above its annealing point (but not high enough to cause distortion) in preparation for a second step in the annealing method.

The second step in each annealing method involves the reduction of ware temperature through the "annealing range" or, more specifically, from its annealing point to its strain point (defined as that temperature from which the ware may be cooled rapidly without the introduction of objectionable permanent strain) and it is here that the present method departs most extensively from the conventional method and achieves a most impressive time economy. The conventional method of annealing involves a very slow reduction of ware temperature in the "annealing range" to approximately 950° F. in the present instance, and, moreover, the temperature reduction is carried out at an increasing rate of reduction as will be apparent from inspection of the curve $x$. In contradistinction, the method of the invention contemplates ware temperature reduction in the "annealing range" at a much higher overall rate of reduction and, more specifically, at a high initial rate of reduction and thereafter at a decreasing rate of reduction with the rate approaching zero as the ware approaches its strain point. Inspection of curve $y$ clearly shows the high initial rate of temperature reduction in the range three (3) to five (5) minutes and the gradually decreasing rate of temperature reduction in the range five (5) to eleven (11) minutes and, in addition, a time economy of approximately nine (9) minutes is to be noted between the points at which the curves $x$ and $y$ reach the 950° F. level.

Still with regard to the "annealing range" it is to be understood that the more rapid present method provides annealed glassware equal and even superior in quality to ware obtained with the conventional method. Glassware is capable of releasing strain readily and at a rapid rate at or near its annealing point and this ability diminishes as the ware approaches its strain point. Thus, the present method is in keeping with and well suited to the strain releasing characteristics of the ware. The initial high rate of temperature reduction takes advantage of the greater strain releasing capability of the ware in the higher temperature range and the comparatively low rate of temperature reduction at and near the strain point is particularly well adapted to the diminished strain releasing capabilities of the ware in this temperature range.

Referring now particularly to the cooling range or zone below the strain point, a still further time economy is in evidence. Curve $x$, representing the conventional method, reflects a gradual and substantially constant rate temperature reduction throughout this range. On the other hand, the method of the present invention converts from one type of cooling to another when a first type of cooling loses effectiveness and this conversion results in a substantially higher overall cooling rate. "Muffle cooling" is employed in a first portion $m$ of the cooling range or zone and may take the form of a conventional type of radiation cooling. As will be noted, the rate of ware temperature reduction gradually decreases in this portion of the cooling range and it may be said that the muffle cooling loses effectiveness as ware temperature is reduced. When the loss in effectiveness has reached a point (at approximately 500° in the example given), conversion to a second type of cooling is accomplished. The portion $t$ of the cooling range or zone is here referred to and the type of cooling employed may be characterized as "forced tempered air cooling." Forced tempered air cooling involves the use and application of heated air for direct flow over and in contact with the ware. As will be noted, the forced tempered air cooling initially effects ware temperature reduction at a higher rate than the terminal rate for muffle cooling. As forced tempered air cooling continues, however, the rate of ware temperature reduction decreases and cooling effectiveness is diminished. The portion $a$ of the cooling range or zone represents "forced room or atmospheric air cooling" and clearly shows the manner in which cooling effectiveness is enhanced. The room or atmospheric air cooling initially effects ware temperature reduction at a substantially higher rate than the terminal rate obtained with forced tempered air cooling. Thus, each type of cooling is employed in the temperature range to which it is best suited with the result of high overall cooling efficiency.

Finally, inspection of the terminals of the curves $x$ and $y$ demonstrates an overall time economy in favor of the present method in the neighborhood of fifteen (15) minutes in a sixty (60) minute example. As will be apparent this reflects a substantial reduction in lehr length and bulk, a consideration of critical importance in the present art.

The invention claimed is:
1. A method for annealing glassware comprising the steps of heating the ware to a temperature approximately at its annealing point, cooling the ware from said temperature initially at a rate of temperature reduction higher than that normally employed for the type of glassware being annealed and thereafter at a decreasing rate of temperature reduction to substantially the strain point of the ware, and further cooling the ware.

2. A method of annealing glassware as set forth in claim 1 wherein the ware is cooled so that the rate of temperature reduction approaches zero as the glassware temperature approaches the strain point.

3. A method of annealing glassware comprising the steps of providing at least three temperature zones of predetermined horizontal dimension, conveying the ware in upright attitude and in a generally horizontal direction successively through said zones, heating the ware in the first zone to a temperature approximately at its annealing point, cooling the ware by radiation from said temperature level in the second zone to reduce its temperature initially at a rate of temperature reduction higher than that normally employed for the type of glassware being annealed and thereafter at a decreasing rate of reduction to substantially the strain point of the ware, and further cooling the ware in the third zone.

4. A method of annealing glassware comprising the steps of providing at least three temperature zones of predetermined horizontal dimension, conveying the ware in upright attitude and in a generally horizontal direction successively through said zones, heating the ware in the first zone to a temperature approximately at its annealing point, cooling the ware by radiation from said temperature level in the second zone to reduce its temperature initially at a rate of temperature reduction higher than that normally employed for the type of glassware being annealed and thereafter at a decreasing rate of reduction to substantially the strain point of the ware, and further cooling the ware in the third zone first by radiation and thereafter by passing cooling air thereover, the radiation cooling being terminated and the air cooling commencing on the occurrence of a significant decrease in the rate of ware temperature reduction during radiation cooling.

5. A method of annealing as set forth in claim 4 wherein air cooling is accomplished first by tempered air and thereafter by air at substantially ambient temperature, and wherein tempered air cooling terminates and ambient air cooling commences on the occurrence of a significant decrease in the rate of ware temperature reduction during tempered air cooling.

References Cited by the Examiner
UNITED STATES PATENTS
1,585,542   5/1926   Henry _____ 65—117

DONALL H. SYLVESTER, *Primary Examiner.*

A. D. KELLOGG, *Assistant Examiner.*